United States Patent Office 3,037,943
Patented June 5, 1962

3,037,943
PREPARATION OF CATALYSTS FOR THE
POLYMERIZATION OF EPOXIDES
Fred N. Hill, South Charleston, and John T. Fitzpatrick and Frederick E. Bailey, Jr., Charleston, W. Va., assignors to Union Carbide Corporation, a corporation of New York
No Drawing. Original application Dec. 29, 1958, Ser. No. 783,100, now Patent No. 2,969,402, dated Jan. 24, 1961. Divided and this application Nov. 16, 1959, Ser. No. 852,940
6 Claims. (Cl. 260—2)

This application is a division of application Serial No. 783,100, filed December 29, 1958, now U.S. Patent 2,969,402, patented January 24, 1961.

This invention relates to the preparation of compositions which are catalytically active for the polymerization of epoxide compounds which contain a cyclic group composed of two carbon atoms and one oxygen atom.

Various divalent metal amides, $H_2N-M-NH_2$, and divalent metal amide-alcoholates, $H_2N-M-OR$, and mixtures thereof, have been described in our copending applications Serial No. 783,185, filed December 29, 1958, and Serial No. 852,611, filed November 13, 1959, respectively, as being effective catalysts for the polymerization of epoxide compounds, notably olefin oxides. In the above-depicted formulas the variable M is a divalent metal such as magnesium, calcium, zinc, strontium, cadmium, or barium, and the variable R is a monovalent organic radical such as alkyl, cycloalkyl, and the like. The instant invention, in one aspect, also is directed to a novel class of catalysts which are extremely effective in polymerizing olefin oxides to useful polymers. These novel catalysts can be advantageously employed in the suspension polymerization of, for example, ethylene oxide to produce granular poly(ethylene oxide). It is pointed out at this time that the term "suspension polymerization process," as used herein including the appended claims, refers to polymerization in the presence of an inert, normally-liquid organic diluent in which the monomer employed is soluble and the polymer produced is insoluble. In contrast to the granular ethylene oxide polymers produced via the suspension polymerization route using the metal amides, the metal amide-alcoholates, or mixtures thereof, as catalysts, it has been observed that, in general, granular ethylene oxide polymers possessing relatively low reduced viscosity values are obtained (at faster rates of polymerization) when employing the novel catalysts of this invention. This result was, indeed, highly unexpected and unobvious. While the relatively high molecular weight polymers, e.g., poly(ethylene oxide), have commercial utility for a wide variety of applications and uses, such polymers must be molecularly degraded for various other uses and applications. For instance, where the uses intended for the polymer require a high concentration of solids in solution without producing a solution that is extremely viscous so as to be difficult to handle or process, a relatively low molecular weight polymer is desired. It also should be borne in mind that the molecular degradation of relatively high molecular weight polymers by mechanical or physical means is an added inconvenience and uneconomical.

The novel catalysts of this invention are prepared by the mutual reaction and/or interaction of an alkaline earth metal hexammoniate, an olefin oxide, and an organic nitrile. The reaction is carried out in a liquid ammonia medium. In principle, the reaction temperature can range from above about the freezing point of ammonia, i.e., about —78° C., to the critical temperature of ammonia, i.e., about +133° C. The preservation of a liquid ammonia phase obviously requires pressurized equipment at reaction temperatures above the atmospheric boiling point of ammonia, i.e., about —33° C. A reaction temperature in the range of from above about the freezing point of the liquid ammonia medium to about 25° C. is preferred. In a more preferred aspect the upper temperature is about 10° C.

The ratio of the three components, i.e., alkaline earth metal hexammoniate, olefin oxide, and organic nitrile, can be varied over a wide range in the preparation of the novel catalysts. The reaction is conducted, as indicated previously, in an excess liquid ammonia medium. Thus, active catalysts can be prepared by employing from about 0.3 to 1.0 mol of olefin oxide per mol of metal hexammoniate, and from about 0.2 to 0.8 mol of organic nitrile per mol of metal hexammoniate. Extremely active catalyst can be prepared by employing from about 0.4 to 1.0 mol of olefin oxide per mol of metal hexammoniate, and from about 0.3 to 0.6 mol of organic nitrile per mol of metal hexammoniate. It should be noted that the alkaline earth metal hexammoniate, $M(NH_3)_6$ wherein M can be calcium, barium, or strontium, contains alkaline earth metal in the zero valence state. Thus, the concentration or mol ratio of the olefin oxide and the organic nitrile is more conveniently based upon alkaline earth metal per se rather than alkaline earth metal hexammoniate.

The olefin oxides contemplated as reagent in the preparation of the novel catalyst are those containing solely carbon, hydrogen, and oxirane oxygen which is bonded to vicinal or adjacent carbon atoms to form an epoxy group, i.e.,

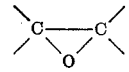

Illustrative olefin oxides include, among others, ethylene oxide, propylene oxide, 1,2-epoxybutane, 2,3-epoxybutane, the epoxypentanes, the epoxyhexanes, the epoxyoctanes, the epoxydecanes, the epoxydodecanes, 2,4,4-trimethyl-1,2-epoxypentane, 2,4,4-trimethyl-2,3-epoxypentane, styrene oxide, cyclohexylepoxyethane, 1-phenyl-1,2-epoxypropane, 7-oxabicyclo[4.1.0]heptane, 6-oxabicyclo-[3.1.0]hexane, 3-methyl-6-oxabicyclo[3.1.0]hexane, 4-ethyl-6-oxabicyclo[3.1.0]hexane, and the like. Lower olefin oxides are preferred, that is, ethylene oxide, propylene oxide, 1,2-epoxybutane, 2,3-epoxybutane, and the like.

The organic nitriles which are employed in the catalyst preparation are, preferably, the saturated aliphatic nitriles. Among the organic nitriles which are contemplated include, for example, acetonitrile, propionitrile, butyronitrile, valeronitrile, isovaleronitrile, capronitrile, caprylonitrile, caprinitrile, and the like. Lower saturated aliphatic nitriles are preferred, that is, acetonitrile, propionitrile, butyronitrile, and the like. Acetonitrile is most preferred.

The particular olefin oxide and the particular organic nitrile employed in the catalyst preparation can affect the polymer produced in the polymerization reaction. For instance, catalysts prepared with ethylene oxide are, in general, suitable for the production of higher molecular weight polymer products than those prepared with propylene oxide and other olefin oxides.

It has been previously disclosed in our copending application Serial No. 852,611, filed November 13, 1959, that one mol of alkaline earth metal hexammoniate, e.g., calcium hexammoniate, will react with one mol of olefin oxide, e.g., ethylene oxide, in a liquid ammonia medium to give metal amide-alcoholates of the general formula $H_2N-M-OR$ (for this illustration M is calcium and R is ethoxy). These metal amide-alcoholates are active catalysts for polymerizing olefin oxides to relatively high molecular weight products. The most active catalysts, it was observed, were prepared by reacting one mol of alkaline earth metal hexammoniate with about 0.5 mol of olefin oxide to give a catalyst mixture containing alkaline earth metal amide and alkaline earth metal amide-alcoholate.

In addition, one mol of alkaline earth metal hexammoniate in a liquid ammonia medium will react, in the absence of an olefin oxide, with about 0.5 mol of an organic nitrile, particularly a saturated aliphatic nitrile. Though this reaction is not fully understood, it appears that the organic nitrile is reduced, first to an imine-type structure, and subsequently to an amine-type structure. It can be conjectured that a substantial portion of the imine or amine is displaced from the alkaline earth metal by reaction with the excess liquid ammonia to give alkaline earth metal amides. Whatever the theory or reaction mechanism may be, these reaction products are catalysts for the polymerization of olefin oxides; however, they are considerably less catalytically active than the reaction products containing alkaline earth metal amide-alcoholates described previously. On the other hand, the novel catalysts of this invention are extraordinarily active catalysts for effecting the polymerization of, for example, olefin oxides. In general, the rates of polymerization are higher, and the molecular weights of the polymers produced are lower, by the use of the novel catalysts of this invention as compared to the use of catalysts prepared by the reaction of an olefin oxide or an organic nitrile with alkaline earth metal hexammoniate. The superiority of the novel catalysts is very marked. This unexpected superiority is, indeed, manifest in the suspension polymerization of ethylene oxide. It has been observed that polymerization rates which are higher by a factor of two to five, or more, and polymer products having molecular weights which are lower by a factor of ten, or more, can be obtained with the novel catalysts of this invention (compared with the previously described class of catalysts). The relatively lower molecular weight polymers, as indicated previously, are useful in numerous fields of applications which require polymers having relatively lower melt and solution viscosities.

In the preparation of the novel catalysts, it appears that the olefine oxide reagent becomes bonded to the alkaline earth metal through the oxygen atom, i.e., $R-O-M-$ wherein R would be ethyl when the olefin oxide is ethylene oxide, and M is the alkaline earth metal. However, analyses indicate that very little, if any, of the organic nitrile reagent is contained in the final product. It is believed that the nitrile moieties in the product are ammonolyzed by the excess ammonia present in the system and the nitrile reduction product (or products) is lost in the evaporation step of the excess ammonia. Thus, the organic nitrile appears to serve the unexpected function of promoting the catalyst product, that is, a product analytically similar to that obtained by the reaction of olefin oxide alone with alkaline earth metal hexammoniate, but in an extremely activated form.

During the preparation of the novel catalysts, the storage or transportation of same, and their use as catalysts to effect polymerization of epoxide monomers, it is highly desirable to conduct these operations in the essential absence of impurities which can deleteriously affect said operations such as oxygen, carbon dioxide, water, and the like.

The preparation of the novel catalysts can be suitably carried out by dissolving alkaline earth metal in excess liquid ammonia medium, the reaction vessel being contained in, for example, a Dry Ice-acetone slush bath. To the resulting alkaline earth metal hexammoniate in liquid ammonia medium, there are added the olefin oxide and organic nitrile reagents, preferably as a mixture. If desired, the olefin oxide and organic nitrile reagents can be added separately; however, it is preferred that the separate addition of said reagents to the ammonia solution be conducted simultaneously. During the catalyst preparation agitation of the reaction mixture is desirable. Subsequently, the Dry Ice-acetone bath is removed, and the reaction vessel is exposed to room temperature conditions. After a period of time the excess ammonia weathers or evaporates from the reaction product leaving solid catalytically active material in the reaction vessel. After this, the catalytically active material can be suspended or slurried in an inert, normally-liquid organic vehicle such as, for example, lower dialkyl ether of alkylene glycol, e.g., the dimethyl, diethyl, or dipropyl ethers of diethylene glycol; dioxane; saturated and cycloaliphatic hydrocarbons, e.g., hexane, heptane, cyclohexane, or 2-methylcycloheptane; and the like.

The novel catalysts of this invention are useful in effecting the polymerization of epoxide monomers which contain a cyclic group composed of two carbon atoms and one oxygen atom. These epoxide monomers can be characterized by the following formula:

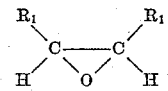

wherein each $R_1$, individually, can be hydrogen, haloaryl, or a hydrocarbon radical free from ethylenic and acetylenic unsaturation such as, for example, alkyl, aryl, cycloalkyl, aralkyl, or alkaryl radicals. In addition, both $R_1$ variables can be alkylene radicals which together with the epoxy carbon atoms, i.e., the carbon atoms of the epoxy group

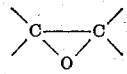

form a saturated cycloaliphatic hydrocarbon nucleus containing from 4 to 10 carbon atoms, preferably from 4 to 8 carbon atoms, for example, cycloalkyl, alkyl-substituted cycloalkyl, cyclobutyl, cyclopentyl, cyclohexyl, cycloheptyl, cyclooctyl, 2-methylcyclopentyl, 3-amylcyclohexyl, and the like. Illustrative $R_1$ radicals include, among others, methyl, ethyl, propyl, butyl, isobutyl, hexyl, isohexyl, 3-propylheptyl, dodecyl, octadecyl, phenyl, halophenyl, chlorophenyl, bromophenyl, benzyl, tolyl, ethylphenyl, butylphenyl, phenethyl, phenylpropyl, cyclopentyl, cyclohexyl, 2-methylcyclohexyl, cycloheptyl, and the like. A single epoxide monomer or an admixture of at least two different epoxide monomers can be employed as the monomeric feed. It is preferred that the epoxide monomer be a lower olefin oxide, that is, ethylene oxide, propylene oxide, 1,2-epoxybutane, 2,3-epoxybutane, and the like. Outstanding results, as indicated earlier, are achieved in polymerizing ethylene oxide via the suspension polymerization route.

Representative epoxide monomers which can be employed in the polymerization process include, for example, ethylene oxide, propylene oxide, 1,2-butylene oxide, 2,3-butylene oxide, the epoxypentanes, the epoxyhexanes, 2,3-epoxyheptane, nonene oxide, 5-butyl-3,4- epoxyoctane, 1,2-epoxydodecane, 1,2-epoxyhexadecane, 1,2-epoxyoctadecane, 5-benzyl-2,3-epoxyheptane, 4-cyclohexyl-2,3-epoxypentane, chlorostyrene oxide, styrene oxide, ortho-, meta-, and para-ethylstyrene oxide, glycidyl benzene, the oxabicycloalkanes and alkyl-substituted oxabicycloalkanes, e.g., 7-oxabicyclo [4.1.0] heptane, 6-oxabicyclo [3.1.0] hexane, 4-propyl-7-oxabicyclo [4.1.0] heptane, 3-amyl-6-oxabicyclo [3.1.0] hexane, and the like.

The catalysts are employed in catalytically significant quantities. In general, a catalyst concentration in the range of from about 0.02, and lower, to about 10, and higher, weight percent, based on the weight of total monomeric feed, is suitable. A catalyst concentration in the range of from about 0.1 to about 3 weight percent, based on the weight of total monomeric feed, is preferred. For optimum results, the particular catalyst employed, its preparation, its surface area, the nature of the monomeric reagent(s), the temperature at which the polymerization reaction is conducted, and other factors will largely determine the desired catalyst concentration.

The polymerization reaction can be conducted over a wide temperature range. Depending on various factors such as the nature of the epoxide monomer(s) employed, the particular catalyst employed, the concentration of the catalyst, and the like, the reaction temperature can be as low as −30° C. and as high as +150° C. A suitable temperature range is from about 0° C. to about 150° C. For the preparation of granular ethylene oxide polymers (which preparation is a highly preferred embodiment and is described hereinafter in detail) a reaction temperature below about 70° C. is suitable. Though granular poly(ethylene oxide) can be prepared at a reaction temperature of about 65°–70° C., the poly(ethylene oxide) product tends to accumulate on the interior surfaces of the reaction equipment. Consequently, it is preferred that the reaction temperature for the preparation of granular poly(ethylene oxide) be in the range of from about −30° to 65° C., and preferably still from about 0° to 60° C. In an extremely desirable aspect the polymerization reaction is conducted below about the softening point of the resulting granular poly(ethylene oxide) product.

In general, the reaction time will vary depending on the operative temperature, the nature of the 1,2-alkylene oxide reagent(s) employed, the particular catalyst and the concentration employed, the surface area of the catalyst employed, the use of an inert diluent, and other factors. The reaction time can be as short as minutes in duration or it can be as long as several days.

When polymerizing an admixture containing two different olefin oxides, the proportions of said olefin oxides can vary over the entire range. Preferably the concentration of either monomeric olefin oxide is in the range of from about 5 to about 95 weight percent, based on the total weight of said olefin oxides.

The polymerization reaction preferably takes place in the liquid phase. Preferably, the polymerization reaction is conducted under an inert atmosphere, e.g., nitrogen. It is also highly desirable to effect the polymerization process under substantially anhydrous conditions. Impurities such as water, aldehyde, carbon dioxide, and oxygen which may be present in the olefin oxide feed and/or reaction equipment should be avoided.

The polymers of this invention can be prepared via the bulk polymerization, suspension polymerization, or the solution polymerization route. The polymerization reaction can be carried out in the presence of an inert organic diluent such as, for example, aromatic hydrocarbons, e.g., benzene, toluene, xylene, ethylbenzene, chlorobenzene, and the like; various oxygenated organic compounds such as anisole, the dimethyl and diethyl ethers of ethylene glycol, of propylene glycol, of diethylene glycol and the like; normally-liquid saturated hydrocarbons including the open chain, cyclic, and alkyl-substituted cyclic saturated hydrocarbons such as hexane, heptane, various normally-liquid petroleum hydrocarbon fractions, cyclohexane, the alkylcyclohexanes, decahydronaphthalene, and the like.

Unreacted monomeric reagent oftentimes can be recovered from the reaction product by conventional techniques such as by heating said reaction product under reduced pressure. The polymer product also can be recovered from the reaction product by washing said reaction product with an inert, normally-liquid organic diluent, and subsequently drying same under reduced pressure at slightly elevated temperatures. Another route involves dissolution in a first inert organic solvent, followed by the addition of a second inert organic solvent which is miscible with the first solvent but which is a non-solvent for the polymer product, thus precipitating the polymer product. Recovery of the precipitated polymer can be effected by filtration, decantation, etc., followed by drying same as indicated previously. Granular poly(ethylene oxide) can be recovered from the reaction product by filtration, decantation, etc., followed by drying said granular poly(ethylene oxide) under reduced pressure at slightly elevated temperatures, e.g., about 30°–40° C. If desired, the granular poly(ethylene oxide), prior to the drying step, can be used with an inert, normally-liquid organic diluent in which the granular polymer is insoluble, e.g., heptane, cyclohexane, and the like, and then dried as illustrated above.

As indicated previously the novel catalysts of the instant invention are highly useful in the preparation of granular poly(ethylene oxide) via the suspension polymerization process. Granular poly(ethylene oxide) results from the suspension polymerization of an agitated reaction mixture comprising ethylene oxide in contact with a catalytic amount of the novel catalysts previously described, the suspension polymerization reaction being conducted at a temperature below about the softening point of the resulting granular poly(ethylene oxide) product. A suitable temperature range is from about −30° to +65° C., and preferably from about 0° to 60° C. Agitation of the reaction mixture is necessary in order to maintain catalyst suspended in said reaction mixture during the course of polymerization reaction.

Unlike the granular poly(ethylene oxide) which directly results from the suspension polymerization route as illustrated above, the bulk or solution polymerization of ethylene oxide yields non-granular resinous poly(ethylene oxide) which is substantially an entire polymeric mass or an agglomerated polymeric mass or it is dissolved in the inert, organic diluent. It is understood, of course, that the term "bulk polymerization" refers to polymerization in the absence of an inert, normally-liquid organic diluent, and the term "solution polymerization" refers to polymerization in the presence of an inert, normally-liquid organic diluent in which the monomer employed and the polymer produced are soluble.

That granular poly(ethylene oxide) should directly result by effecting the instant invention via the suspension polymerization route was, indeed, highly surprising and unexpected. Granular poly(ethylene oxide) possesses several highly desirable characteristics. One can recover granular poly(ethylene oxide) from the reaction product by the mere technique of decantation or filtration, followed by drying at slightly elevated temperatures, e.g., 30–40° C. Further treatment is unnecessary and the granular polymer can be shipped to customers in bags or drums. Poly(ethylene oxide) prepared via the solution polymerization route necessitates the complete removal of the inert organic vehicle at elevated temperatures in order to recover the polymer dissolved in said vehicle. The resulting polymer, of course, is not granular. Mechanical means, e.g., Marshall mill, extruding equipment, hammer mill, and the like, are necessary to reduce non-granular, resinous ethylene oxide prepared by the bulk or solution polymerization routes to a particle size which approximately corresponds to the synthetically formed granular poly(ethylene oxide). As is apparent, such mechanical expedients are expensive and time-consuming.

Granular poly(ethylene oxide) which has a reduced viscosity value in acetonitrile of at least 1.0 can be produced (as previously indicated) via the suspension polymerization route by employing an inert, normally-liquid organic diluent in which the ethylene oxide monomer is soluble and the resulting polymer is insoluble. It is understood, of course, that the diluent employed is non-reactive with ethylene oxide. Illustrative diluents suitable in the suspension polymerization process are the normally-liquid saturated hydrocarbons, e.g., saturated aliphatic hydrocarbons, saturated cycloaliphatic and alkyl-substituted cycloaliphatic hydrocarbons; various normally-liquid saturated ethers; and the like. Examples of preferred diluents include, among others, hexane, heptane, isoheptane, ethylpentane, the octanes, the decanes, various petroleum hydrocarbon fractions, cyclohexane, alkyl-substituted cyclohexanes, decahydronaphthalene, and the like. Other illustrative diluents which can be employed include diethyl, dipropyl, dibutyl, and higher dialkyl ethers; dioxane; the lower glycol dialkyl ethers of diethylene glycol; and the like. It is to be noted that certain of these ether diluents become solvents for the polymer at elevated temperatures. Among such ethers are dioxane, the dimethyl and diethyl ethers of ethylene glycol and diethylene glycol.

By the term "reduced viscosity," as used herein including the appended claims, is meant a value obtained by dividing the specific viscosity by the concentration being measured in grams of polymer per 100 milliliters of solvent at a given temperature, and it is regarded as a measure of molecular weight. The specific viscosity is obtained by dividing the difference between the viscosity of the solution and the viscosity of the solvent by the viscosity of the solvent. Unless otherwise indicated, the reduced viscosity value is determined at a concentration of 0.2 gram of polymer per 100 milliliters of solvent, i.e., acetonitrile, at 30° C.

The polymerization process can be carried out in a sealed reaction vessel under the autogenous pressure of the reaction mixture. It is preferred to employ from about 3 to about 400 parts by weight of ethylene oxide per 100 parts by weight of diluent; however, lower or higher proportions of ethylene oxide can also be employed.

A preferred method for producing granular poly(ethylene oxide) is to feed the ethylene oxide into the stirred diluent which contains the novel catalyst, the reaction temperature being maintained below about the softening point of the resulting granular polymer product, e.g., below about 65°–70° C. When operating in this manner pressure equipment is not necessary. The ethylene oxide is fed into the stirred diluent and unreacted ethylene oxide, if any, is allowed to pass out of the reaction vessel, for example, through a vent, an appropriately adjusted blow-off valve, or other means, as desired. When the process is conducted, for example, under atmospheric pressure at a temperature of about 40° C., the solubility of ethylene oxide in heptane is about 10 parts by weight of ethylene oxide per 100 parts by weight of heptane. The reaction proceeds readily under conditions of pressure and temperature when the concentration of ethylene oxide is about 3 parts by weight of ethylene oxide per 100 parts by weight of diluent. It is highly desirable to conduct the suspension polymerization reaction under a blanket of nitrogen gas, care being taken to exclude oxygen and carbon dioxide. The suspension polymerization can be conducted as a batch, semi-continuous, or a continuous process.

The solid homopolymers prepared in accordance with the teachings of this invention are a useful class of compounds. The ethylene oxide polymers are hard, firm, tough and resinous in character, and they have a reduced viscosity value of at least about 1.0, and higher, in acetonitrile. The ethylene oxide polymers appear to form homogeneous systems with water in all proportions. The water solutions are viscous, the viscosity increasing both with the concentration of the polymer and the molecular weight of the polymer. The ethylene oxide polymers show little change in melting point with increased molecular weight and the melting point, as measured by change in stiffness with temperature, is found to be about 65°±2° C. throughout the range of reduced viscosity values of from 1 to 20, and greater (in acetonitrile). The crystallization temperature, as determined by measuring the break in the cooling curve, is about 55° C. The ethylene oxide polymers are soluble in water, acetonitrile, chloroform, methanol, and mixtures of water and higher saturated aliphatic alcohols. The ethylene oxide polymers are insoluble in glycerol and normally-liquid saturated aliphatic hydrocarbons.

The novel catalysts of the instant invention are also useful for the production of solid homopolymers of other olefin oxides such as, for example, poly(propylene oxide), poly(butylene oxide), poly(pentylene oxide), poly(styrene oxide), and the like.

In addition, the novel catalysts of this invention are useful for the preparation of water-soluble or water-insoluble solid copolymeric compositions. In general, those copolymers containing a minor proportion, i.e., less than about 50 weight percent, of ethylene oxide copolymerized therein are solid water-insoluble compositions. However, it is generally observed copolymers containing greater than about 50 weight percent of ethylene oxide chemically combined in said copolymers, tend to be water-soluble, and this water-soluble characteristic increases as the ethylene oxide content of the resulting copolymer increases. Thus, the instant invention is admirably suited for the preparation of "tailor-made" solid copolymers that have characteristics and properties built into said copolymers which cover a spectrum of properties that are highly desirable in various fields of applications and uses.

The polymers produced by using the novel catalysts of this invention have a variety of uses. The resinous polymers are useful for the production of various shaped articles, e.g., buttons, brush handles, lamp bases, etc. The relatively low molecular weight granular ethylene oxide polymers, i.e., poly(ethylene oxide) which possess a reduced viscosity value of from about 1.0 to about 10 in acetonitrile, have extraordinary utility in various fields of applications which heretofore required molecular degradation of the correspondingly higher molecular weight polymer for the same fields. For instance, to obtain optimum results in the art of sizing textile yarn with resinous poly(ethylene oxide), it is highly desirable to employ an ethylene oxide polymer whose reduced viscosity value is in the range, for example, of from about 1.0 to 5.0. It is readily appreciated that many fields of applications require solutions which have a high solids content at relatively low viscosities. The relatively low molecular weight granular ethylene oxide polymers which are produced by using the novel catalysts of this invention are admirably suited for such applications. The water-soluble and water-insoluble solid polymers are also useful in the preparation of films by conventional techniques such as by milling on a two-roll mill, calendering, solvent casting, and the like. The homopolymers of the lower olefin oxides and the copolymers containing a lower olefin oxide as a comonomer are preferred polymeric classes. Those copolymers containing ethylene oxide, and in particular greater than about 50 weight percent ethylene oxide, are especially preferred polymeric classes.

The following examples are illustrative.

*Example 1*

Liquid ammonia (2 liters) was added to a resin flask (maintained in a Dry Ice-acetone bath, the temperature of which was about −70° C.). Calcium metal nodules (40 grams) was then dissolved in the stirred liquid ammonia. The characteristic deep blue color of calcium hexammoniate appeared. To the resulting solution there were slowly added 20 grams of acetonitrile. During the addition of acetonitrile, the blue color of the calcium hexammoniate solution disappeared; the resulting reaction mixture was grayish-white in color. The external Dry Ice-acetone bath then was removed, and the flask was exposed to room temperature conditions, i.e., approximately 22° C., for 16 hours. After this period of time the liquid ammonia phase had disappeared (weathered or evaporated from the system) and a gray-white solid remained. This solid product was placed in a stainless steel container, and said product was covered with heptane. Subsequently, this admixture was agitated in a reciprocating paint shaker for one hour thus producing a catalyst slurry or suspension in heptane. Throughout the operation extreme care was taken to exclude the presence of oxygen, water, and carbon dioxide from the reaction system.

*Example 2*

To a 2-liter glass resin flask equipped with a stirrer, thermometer, inlet conduit in the lower portion of the flask, and an outlet conduit connected to an exhaust system, there were charged 100 grams of liquid ethylene oxide, one liter of heptane, and a quantity of the catalyst suspension prepared as set forth in Example 1 supra, said catalyst suspension containing 1.0 gram of calcium calculated as the metal. Gaseous ethylene oxide was introduced into the resin flask via the inlet conduit and bubbled through the resulting mixture during the course of the polymerization reaction. Excess ethylene oxide was removed via the outlet conduit. In this manner, the reaction medium was continuously saturated with ethylene oxide. The polymerization reaction was maintained at 18° to 29° for a period of 5 hours. The resulting finely-divided polymer was recovered from the reaction product by filtration, followed by overnight drying same at room temperature, i.e., about 22° C. There were obtained 28 grams of white, granular poly(ethylene oxide) which had a reduced viscosity value in acetonitrile of 36.2.

*Example 3*

To the equipment described in Example 2, there were charged one liter of heptane, 100 grams of liquid ethylene oxide, and a quantity of calcium amide, $Ca(NH_2)_2$, which contained 1.0 gram of calcium calculated as the metal. Ethylene oxide was bubbled through the resulting mixture in the same manner as explained in Example 2. The polymerization reaction was maintained at 18° to 31° C. for a period of 7 hours. The resulting finely-divided polymer was recovered from the reaction product by filtration, followed by drying same at room temperature under reduced pressure. There were obtained 32 grams of granular poly(ethylene oxide) which had a reduced viscosity value in acetonitrile of 48.0.

*Example 4*

To a 500 cc. Parr bomb maintained in Dry Ice-acetone bath, there were charged 5 grams of calcium metal, 2.6 grams of liquid ethylene oxide, and 87 grams of liquid ammonia. The Parr bomb was then removed from the Dry Ice-acetone bath and placed in an ice-water bath. After 2 hours at approximately 0° C., a steady pressure of 100 p.s.i.g. was noted. Of this pressure about 47 p.s.i.g. was due to ammonia and about 53 p.s.i.g. was due to hydrogen. After the steady pressure noted above was obtained, the bomb was vented and the product slurried in heptane.

To the equipment described in Example 2, there were charged one liter of heptane and a quantity of the catalyst slurry prepared as described above, said catalyst slurry containing 1.0 gram of calcium calculated as the metal. Ethylene oxide was bubbled through the resulting mixture in the same manner as explained in Example 2. The polymerization reaction was maintained at 25° to 38° C. for a period of 7 hours. The resulting finely-divided polymer was recovered from the reaction product by filtration, followed by drying same at room temperature under reduced pressure. There were obtained 114 grams of white, granular poly(ethylene oxide) which had a reduced viscosity value in acetonitrile of 55.8.

*Example 5*

A catalyst was prepared in the same manner as set forth in Example 1 supra except that a mixture of 11 grams of acetonitrile and 22 grams of ethylene oxide was used in lieu of 20 grams of acetonitrile.

To the equipment described in Example 2, there were charged one liter of heptane, 100 grams of liquid ethylene oxide, and a quantity of the catalyst slurry prepared as described above, said catalyst slurry containing 1.0 gram of calcium calculated as the metal. Ethylene oxide was bubbled through the resulting mixture in the same manner as explained in Example 2. The polymerization reaction was maintained at 19° to 43° C. for a period of 7 hours. The resulting finely-divided polymer was recovered from the reaction product by filtration, followed by drying same at room temperature under reduced pressure. There were obtained 123 grams of white, granular poly(ethylene oxide) which had a reduced viscosity value in acetonitrile of 32.5.

*Example 6*

A catalyst was prepared in the same manner as set forth in Example 1 supra except that a mixture of 11 grams of acetonitrile and 29 grams of proylene oxide was used in lieu of 20 grams of acetonitrile.

To the equipment described in Example 2, there were charged one liter of heptane, 100 grams of liquid ethylene oxide, and a quantity of the catalyst slurry prepared as described above, said catalyst slurry containing 1.0 gram of calcium calculated as the metal. Ethylene oxide was bubbled through the resulting mixture in the same manner as explained in Example 2. The polymerization reaction was maintained at 24° to 50° C. for a period of 5.5 hours. The resulting finely-divided polymer was recovered from the reaction product by filtration, followed by drying same at room temperature under reduced pressure. There were obtained 191 grams of white, granular poly(ethylene oxide) which had a reduced viscosity value in acetonitrile of 17.6.

The catalyst prepared as set forth in the first paragraph of this example is effective, also, in homopolymerizing propylene oxide or 1,2-epoxydodecane at a temperature of about 85° C. to solid products.

*Example 7*

A catalyst was prepared in the same manner as set forth in Example 1 supra except that a mixture of 21 grams of acetonitrile and 58 grams of propylene oxide was used in lieu of 20 grams of acetonitrile.

To the equipment described in Example 2, there were charged one liter of heptane, 100 grams of liquid ethylene oxide, and a quantity of the catalyst slurry prepared as described above, said catalyst slurry containing 1.0 gram of calcium calculated as the metal. Ethylene oxide was bubbled through the resulting mixture in the same manner as explained in Example 2. The polymerization reaction was maintained at 27° to 61° C. for a period of 6 hours. The resulting finely-divided polymer was revcovered from the reaction product by filtration, followed by drying same at room temperature under reduced pressure. There were obtained 142 grams of white, granular poly(ethylene oxide) which had a reduced viscosity value in acetonitrile of 6.1.

A catalyst prepared in the same manner as set forth in the first paragraph of this example using, however, approximately 88 grams of strontium in lieu of 40 grams of calcium is effective in copolymerizing ethylene oxide and propylene oxide at 95° C. to give a solid product.

Example 8

A catalyst was prepared in the same manner as set forth in Example I supra except that a mixture of 16 grams of acetonitrile and 55 grams of propylene oxide was used in lieu of 20 grams of acetonitrile.

To the equipment described in Example 2, there were charged one liter of heptane, 100 grams of liquid ethylene oxide, and a quantity of the catalyst slurry prepared as described above, said catalyst slurry containing 1.0 gram of calcium calculated as the metal. Ethylene oxide was bubbled through the resulting mixture in the same manner as explained in Example 2. The polymerization reaction was maintained at 27° to 51° C. for a period of 5.5 hours. The resulting finely-divided polymer was recovered from the reaction product by filtration, followed by drying same at room temperature under reduced pressure. There were obtained 181 grams of white, granular poly(ethylene oxide) which had a reduced viscosity value in acetonitrile of 10.1.

A catalyst prepared in the same manner as set forth in the first paragraph of this example, using, however, about 137 grams of barium in lieu of 40 grams of calcium is effective in copolymerizing ethylene oxide and 7-oxabicyclo[4.1.0]heptane at 110° C. to give a solid product.

Example 9

A catalyst was prepared in the same manner as set forth in Example 1 supra except that a mixture of 11 grams of acetonitrile and 44 grams of propylene oxide was used in lieu of 20 grams of acetonitrile.

To the equipment described in Example 2, there were charged one liter of heptane, 100 grams of liquid ethylene oxide, and a quantity of the catalyst slurry prepared as described above, said catalyst slurry containing 1.0 gram of calcium calculated as the metal. Ethylene oxide was bubbled through the resulting mixture in the manner as explained in Example 2. The polymerization reaction was maintained at 19° to 51° C. for a period of 5.25 hours. The resulting finely-divided polymer was recovered from the reaction product by filtration, followed by drying same at room temperature under reduced pressure. There were obtained 197 grams of white, granular poly(ethylene oxide) which had a reduced viscosity value in acetonitrile of 13.4.

Example 10

A catalyst was prepared in the same manner as set forth in Example 1 supra except that a mixture of 28 grams of propionitrile and 58 grams of propylene oxide was used in lieu of 20 grams of acetonitrile.

To the equipment described in Example 2, there were charged one liter of heptane, 100 grams of liquid ethylene oxide, and a quantity of the catalyst slurry prepared as described above, said catalyst slurry containing 1.0 gram of calcium calculated as the metal. Ethylene oxide was bubbled through the resulting mixture in the same manner as explained in Example 2. The polymerization reaction was maintained at 20° to 51° C. for a period of 5 hours. The resulting finely-divided polymer was recovered from the reaction product by filtration, followed by drying same at room temperature under reduced pressure. There were obtained 84 grams of white, granular poly(ethylene oxide) which had a reduced viscosity value in acetonitrile of 2.97.

Example 11

A catalyst was prepared in the same manner as set forth in Example 1 supra except that a mixture of 21 grams of acetonitrile and 72 grams of butylene oxide was used in lieu of 20 grams of acetonitrile.

To the equipment described in Example 2, there were charged one liter of heptane, 100 grams of liquid ethylene oxide, and a quantity of the catalyst slurry prepared as described above, said catalyst slurry containing 1.0 gram of calcium calculated as the metal. Ethylene oxide was bubbled through the resulting mixture in the same manner as explained in Example 2. The polymerization reaction was maintained at 23° to 45° C. for a period of 6 hours. The resulting finely-divided polymer was recovered from the reaction product by filtration, followed by drying same at room temperature under reduced pressure. There were obtained 80 grams of white, granular poly(ethylene oxide) which had a reduced viscosity value in acetonitrile of 4.7.

Example 12

A catalyst was prepared in the same manner as set forth ni Example 1 supra except that a mixture of 35 grams of n-butyronitrile and 58 grams of propylene oxide was used in lieu of 20 grams of acetonitrile.

To the equipment described in Example 2, there were charged one liter of heptane, 100 grams of liquid ethylene oxide, and a quantity of the catalyst slurry prepared as described above, said catalyst slurry containing 1.0 gram of calcium calculated as the metal. Ethylene oxide was bubbled through the resulting mixture in the same manner as explained in Example 2. The polymerization reaction was maintained at 19° to 48° C. for a period of 6 hours. The resulting finely-divided polymer was recovered from the reaction product by filtration, followed by drying same at room temperature under reduced pressure. There were obtained 92 grams of white, granular poly(ethylene oxide) which had a reduced viscosity value in acetonitrile of 3.78.

Although the invention has been illustrated by the preceding examples, the invention is not to be construed as limited to the materials employed in the above-exemplary examples, but rather, the invention encompasses the generic area as hereinbefore disclosed. Various modifications and embodiments of this invention can be made without departing from the spirit and scope thereof.

What is claimed is:

1. A process for producing granular poly(ethylene oxide) which comprises contacting ethylene oxide with from about 0.02 to about 10 weight percent, based on the weight of said ethylene oxide, of a polymerization catalyst, under substantially anhydrous conditions, at a temperature in the range of from about −30° C. to +65° C., in the presence of an inert, normally-liquid organic vehicle in which said ethylene oxide is soluble and the resulting granular poly(ethylene oxide) is insoluble; agitating the reaction mixture to thus maintain said polymerization catalyst suspended therein; for a period of time sufficient to produce granular poly(ethylene oxide); said polymerization catalyst being prepared by a process which comprises reacting alkaline earth metal hexammoniate with from about 0.3 to 1.0 mol of olefin oxide and from about 0.2 to 0.8 mol of organic nitrile, based on 1.0 mol of said alkaline earth metal hexammoniate, the reaction being conducted in an excess liquid ammonia medium, and subsequently evaporating from the resulting product mixture the excess liquid ammonia.

2. The process of claim 1 wherein said polymerization catalyst is prepared by a process which comprises reacting alkaline earth metal hexammoniate with from about 0.4 to 1.0 mol of olefin oxide and from about 0.3 to 0.6 mol of saturated aliphatic nitrile, based on 1.0 mol of said alkaline earth metal hexammoniate, the reaction being conducted in an excess liquid ammonia medium, under operative conditions sufficient to maintain said ammonia medium in an essentially liquid state, and subsequently evaporating from the resulting product mixture the excess liquid ammonia.

3. The process of claim 1 wherein said polymerization catalyst is prepared by a process which comprises reacting alkaline earth metal hexammoniate with from about 0.4 to 1.0 mol of lower olefin oxide and from about 0.3 to 0.6 mol of lower saturated aliphatic nitrile, based on 1.0 mol of said alkaline earth metal hexammoniate, the reaction being conducted in an excess liquid ammonia medium, at a temperature in the range of from above about the freezing point of ammonia to about 25° C. under a pressure sufficient to maintain said ammonia in an essentially liquid state, and subsequently evaporating from the resulting product mixture the excess liquid ammonia.

4. The process of claim 3 wherein the solid product remaining after the evaporation of the excess liquid ammonia therefrom is slurried in an inert, normally-liquid organic vehicle.

5. The process of claim 3 wherein said alkaline earth metal hexammoniate is calcium hexammoniate, wherein said lower olefin oxide is ethylene oxide, and wherein said lower saturated aliphatic nitrile is acetonitrile.

6. The process of claim 3 wherein said alkaline earth metal hexammoniate is calcium hexammoniate, wherein said lower olefin oxide is propylene oxide, and wherein said lower aliphatic nitrile is propionitrile.

No references cited.